Sept. 22, 1964 G. C. SUMMERS 3,150,321
BURIED PIPE COMMUNICATIONS SYSTEMS UTILIZING
EARTH POLARIZATION PHENOMENON
Filed Aug. 5, 1960 2 Sheets-Sheet 1

GERALD C. SUMMERS
INVENTOR.

BY *Wm. T. Wofford*
*Attorney*

Sept. 22, 1964  G. C. SUMMERS  3,150,321
BURIED PIPE COMMUNICATIONS SYSTEMS UTILIZING
EARTH POLARIZATION PHENOMENON
Filed Aug. 5, 1960  2 Sheets-Sheet 2

GERALD C. SUMMERS
INVENTOR.

BY *Wm T Wofford*
Attorney

United States Patent Office 3,150,321
Patented Sept. 22, 1964

3,150,321
BURIED PIPE COMMUNICATIONS SYSTEMS UTILIZING EARTH POLARIZATION PHENOMENON
Gerald C. Summers, Dallas, Tex., assignor to The Harvest Queen Mill & Elevator Company, Dallas, Tex., a corporation of Texas
Filed Aug. 5, 1960, Ser. No. 47,815
2 Claims. (Cl. 325—28)

My invention relates to communications systems, and more particularly to communications systems wherein buried or underground pipe is utilized in the system.

There are a number of situations wherein it is desirable that intelligence be transmitted from one location to another or between spaced locations on a string of pipe. For example, in the case of a pipeline for transporting liquid or gaseous products, it is most desirable, and in some cases essential, particularly when substantial distances are involved, to monitor various conditions of the pipeline and product at points along the line as well as to carry out certain control functions. All of this is commonly accomplished by some type of telemetering and control communications system. The present invention, in one of its aspects, involves a novel and advantageous communications system for buried pipelines.

Another situation wherein the present invention finds advantageous application is in the case of a drill string in a bore hole. In the drilling of bore holes in the petroleum industry, the rotary drilling system is commonly employed, wherein a drill bit is rotated on the end of a drill pipe string and drilling mud is continuously circulated in the system; and it is highly desirable to have continuously available at the surface information concerning downhole conditions. To accomplish this, it is of course necessary to have sensing means downhole plus means for transmitting the sensed information to above ground. Such accomplishment has always been a very difficult problem, and although this problem has been approached in various ways, the solutions have left much to be desired.

The principles of my invention are applicable both to the case of the buried pipeline which may be several or many miles in length, and to the bore hole drill string, the pipe in both cases being buried in the sense that it is surrounded by and in contact with earth, or the equivalent, though in the one case generally horizontal, while in the other case generally vertical.

Thus, the general object of my invention is to provide novel and advantageous communications systems for use in the transmission of intelligence between spaced locations on buried pipe.

Another object of my invention is to provide buried pipe communications systems which shall require only low power input levels.

Another object of my invention is to provide buried pipe communications systems which shall require neither wire nor wireless transmission of signals between transmitting and receiving stations.

Another object of my invention is to provide buried pipe communications systems wherein the buried pipe is utilized as a portion of the system.

Another object of my invention is to provide a system for transmitting downhole information to above ground in a rotary bore hole drilling system wherein no wires running up the drill string are required.

These and other objects are effected by my invention as will be apparent from the following description, taken in accordance with the accompanying drawings, forming a part of this application, in which.

In one aspect, my invention contemplates the application of electric signal energy between a buried pipe and earth at a transmitting location, and detection of said signal energy between the buried pipe and earth at a receiving location, the pipe being utilized as a substantially unipotential conductor. This aspect of the invention, as hereinbefore mentioned, is applicable to both bore hole and pipeline communications systems. In another and important aspect, the invention contemplates the utilization of certain earth polarization phenomenon in communications systems, in the case of both bore hole and pipeline communications. In still another aspect, the invention contemplates a novel pipeline communications system involving use of corrosion inhibition means.

Figure 1:
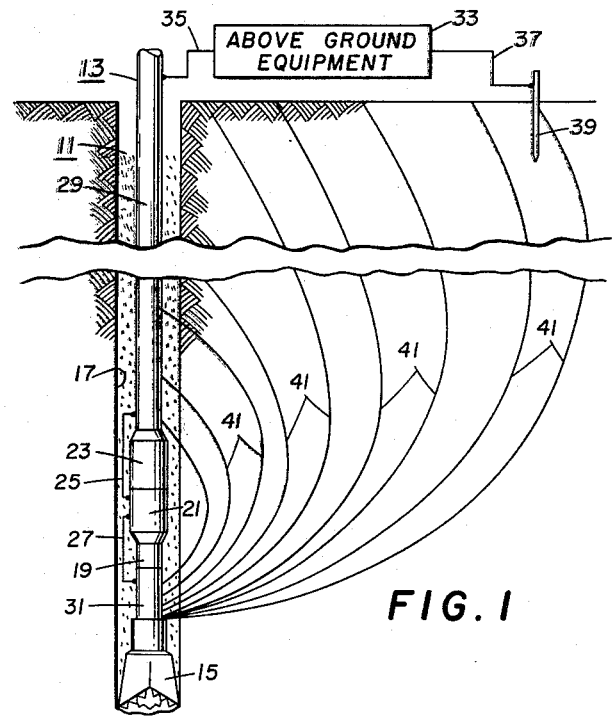
FIGURE 1 is a simplified schematic view illustrating a preferred embodiment of my invention as applied to a bore hole communications system.

Turnng now to FIGURE 1, there is shown schematically a bore hole 11 being drilled with a rotary drilling system wherein the drill string 13 is made up of the usual drill pipe sections and carries a drill bit 15 at its lower end. Drilling mud is being circulated in the system, and fills the space between the drill string 13 and the bore hole sidewall 17. The drill string 13 is provided with an insulating section 19 near its lower end. The insulating section may take any suitable form that will serve to electrically insulate that portion of the drill string above it from that portion of the drill string below it. Next above the insulating section is a first section 21 housing a signal generator and transmitter. Next above the first section is a second section 23 which may house power supplies, sensing devices, amplifiers, and any other instrumentation needed. Many different specific arrangements of signal generators, transmitters, and instrumentation may be used, as will be apparent to those skilled in the art, and the specific arrangements shown and described herein are by way of example only.

The output of the transmitter is applied by suitable means (shown for illustration as leads 25, 27), across the upper and lower drill string portions 29, 31. In other words, one transmitter output terminal is connected to the drill string portion 29 above the insulating section 19 while the other transmitter output terminal is connected to the drill string portion 31 below the insulating section 19. Receiver apparatus, included in "Above Ground Equipment" block 33 of FIGURE 1, is connected via one lead 35 to the drill string (or equivalent) at above ground, and via another lead 37 to earth at 39. In other words, the receiver 33 is connected between the drill string 13 at its upper end portion and the earth at a point spaced laterally away from the bore hole 11.

With apparatus connected as shown in FIGURE 1, signal energy output from the transmitter will cause current flow through the earth as indicated by lines 41 of FIGURE 1 shown in generalized form and in a portion of only one plane. Because of their relatively high conductivity, essentially no potential drop exists across the drill string portions 29, 31. Thus, in effect, a potential (that of the transmitter output) is applied to the earth between the upper and lower portions of the drill string, all along their lengths. Since the earth presents some magnitude of ohmic resistance, then currents due to the applied potential will flow, and potential drops will occur.

Figure 2:
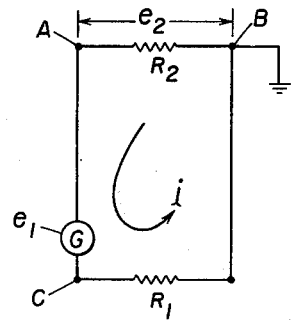
FIGURE 2 is a simplified equivalent circuit diagram for aid in explanation of some aspects of my invention.

In FIGURE 2, consider point A as at the well head, point B as the point at which an electrode 39 is driven above ground and at a distance out away from the well head, and point C as at the lower end portion of the drill string 13. Then let $R_2$ represent the earth resistance between points A and B, and let $R_1$ represent the earth resistance between points B and C. Then $e_1$ is the instantaneous output potential of the generator (or transmitter) G, and $e_2$ is the instantaneous potential between points A and B, or the potential at the receiver input terminals. Potential $e_2$ will then be proportional to $e_1$, though very much smaller. If $e_1$ is made to vary as some function of a downhole parameter, then intelligence could be transmitted to above ground and detected as a function of $e_2$.

The magnitude of signal available above ground as $e_2$ may be greatly enhanced by utilizing the phenomenon of earth polarization. The earth in one sense may be considered an electrolyte, and if current is passed through it in one direction from one electrode to another, an ionic shield will tend to build up upon one or the other of the electrodes, depending upon the polarity of the applied voltage. Thus a polarization effect will occur, and under the polarized condition, a comparatively large drop of voltage will appear between the electrodes. The exact nature and extent of the polarization will of course depend somewhat upon the prevailing chemical conditions of the earth between the electrodes and particularly in their vicinity. The voltage drop between electrodes will always be significantly greater than for the case without polarization. This means that for a given signal input downhole, there will be a greater signal available for detection above ground. By application of suitable techniques, the polarization effect can be utilized to great advantage in communications systems involving buried pipe, both in the case of bore holes and pipelines.

Taking the case of the bore hole, for example, the earth may be considered a unipotential body if most of the polarization is concentrated around the drill pipe. The polarization drop can probably be considered as proportional to the length of pipe involved. Then, considering FIGURE 2 again, but under polarized conditions, the voltage $e_2$ available between points A and B can be calculated as:

$$e_2 = iR_2$$
$$i = \frac{e_1}{R_1 + R_2}$$

then $$e_2 = e_1 \frac{R_2}{R_1 + R_2}$$

Now $R_2$ will be less than $R_1$ by the ratio of pipe lengths involved. Thus, for a practical example, if the lower portion 31 of drill string (below the insulating section) is 90 feet, and the upper portion 29 is 9,000 feet, then $R_1 = 9,000 \div 90 \times R_2 = 100 R_2$. If $e_1$ is 10 volts, then $e_2$ will be 0.1 volt.

To utilize polarization effects, it is necessary to operate at very low frequencies. The operating frequency should be sufficiently low to allow the potential drop due to polarization to build up to a maximum or steady value for each transmitter output voltage excursion. The actual frequency used in a particular case may vary, but most of the benefits of polarization would probably be lost at frequencies above about 2 c.p.s.

Figure 9:
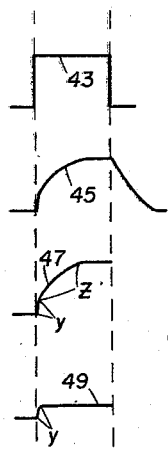

If a square wave signal such as the waveform 43 shown at the top in FIGURE 9 representing a constant current output were present at the transmitter output terminals, then the potential $e_1$ would build up and decay in a manner generally as shown by the waveform 45 next to top in FIGURE 9. At the same time, with polarization, the build-up of $e_2$ would be in the manner generally as shown by the waveform 47 next to bottom in FIGURE 9. Without polarization $e_2$ would look generally like the bottom waveform 49 in FIGURE 9. The waveforms 47 and 49 are of course greatly exaggerated in magnitude, and actually would be much smaller in amplitude than shown. Waveform 47 would however be much larger in amplitude than waveform 49. The first steps $y$ in waveforms 47 and 49 are the result of the true ohmic drop and are propagated at a high velocity, but not at the velocity of light, because of the conductivity of the medium. The second step $z$ build-up in waveform 47 is due to the earth polarization phenomenon.

Figure 4:
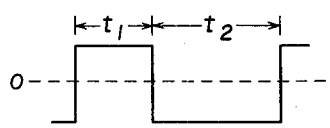
FIGURE 4 is a schematic diagram showing the waveform at the output terminals of the circuit of FIGURE 3.
Figure 3:
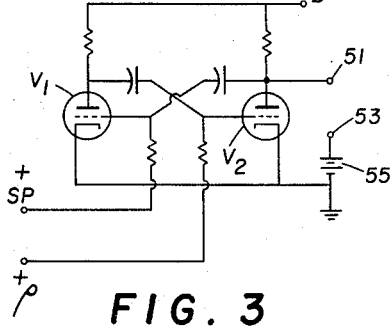
FIGURE 3 is a schematic circuit diagram showing an arrangement for translating a pair of sensed input parameters into outputs suitable for transmission over the communications systems of my invention.

Intelligence may be transmitted using a square waveform such as waveform 43 of FIGURE 9 in various ways known to those skilled in the art, as by varying frequency, amplitude, time length, etc. One suitable arrangement for intelligence transmission of two parameters is illustrated by FIGURES 3 and 4. Assume for example in the case of bore hole telemetering that the two parameters to be transmitted are earth self-potential $sp$ and resistivity $\rho$. Assume that $sp$ and $\rho$ have been sensed and that two positive D.C. currents representing functions respectively proportional to $sp$ and $\rho$ have been produced by downhole instrumentation, and that these currents are applied respectively as inputs to terminals $sp$ and $\rho$ in the circuit of FIGURE 3. The circuit of FIGURE 3 is a conventional astable multivibrator circuit comprising a pair of triodes $V_1$ and $V_2$ arranged such that an increase in signal level at $\rho$ reduces the off-time of triode $V_2$, without at the same time affecting the off-time of $V_1$. The off-time of $V_2$ is represented by $t_1$ in FIG. 4, where the waveform present at the output terminals 51, 53 of the circuit of FIGURE 3 is shown. The on-time of $V_2$ is of course the same as the off-time of $V_1$. An increase in signal level at $sp$ decreases the off-time of $V_1$ (on-time of $V_2$), without affecting the off-time of $V_2$. The off-time of $V_1$ is represented by the time $t_2$ in FIGURE 4. The output terminal 53 is biased, as by a battery 55, so that the waveform of FIGURE 4 is centered at the zero volt level. The waveform of FIGURE 4 thus carries intelligence in the form of varying time intervals $t_1$ and $t_2$ which represent the downhole parameters $\rho$ and $sp$. The waveform of FIGURE 4 is then supplied at the output terminals of the transmitter of FIGURE 1, the frequency being sufficiently low that the earth polarization phenomenon is utilized.

Figure 5:
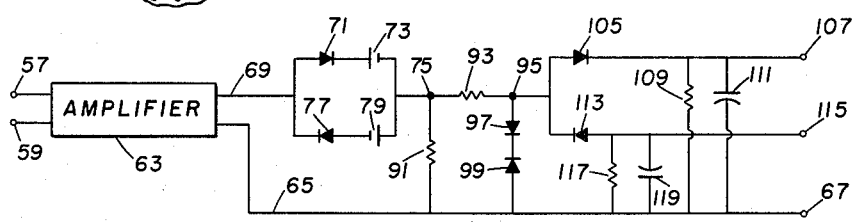
FIGURE 5 is a schematic circuit diagram showing a receiver as utilized in one embodiment of my invention.
Figure 6:
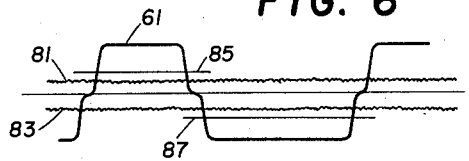
FIGURES 6 and 7 are schematic showings of waveforms to aid in explanation of the invention.
Figure 7:
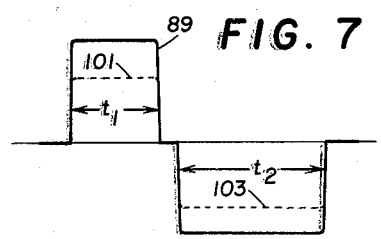

A suitable above ground receiving arrangement for the example under discussion is shown by FIGURE 5; and the waveforms involved are shown by FIGURES 6 and 7. Input terminals 57, 59 of FIGURE 5 may correspond to the terminals of the Above Ground Equipment 33 of FIGURE 1. The waveform of received energy as it might appear at the output terminals of the amplifier is shown in idealized form at 61 in FIGURE 6. The amplifier 63 may be either a D.C. amplifier, or an amplifier together with D.C. restoration means, so that the D.C. level of the signal will not shift up or down with time.

One output terminal of the amplifier is connected via lead 65 to a common terminal 67. The other amplifier terminal is connected via lead 69 in series with a first diode 71 to the positive terminal of a first bias source 73, the negative terminal of which is connected to terminal 75. The other amplifier terminal is also connected in series with a second diode 77 and to the negative terminal of a second bias source 79, the positive terminal of which is also connected to terminal 75. The first diode 71 is poled to conduct in the direction toward terminal 75, while the second diode 77 is poled to conduct in the opposite direction. The noise level of signals at the output of amplifier 63 is indicated at 81 and 83 in FIGURE 6. The first and second diodes 71, 77 and their associated bias sources 73, 79 constitute a first clipper network which functions to clip the signal shown in FIGURE 6 at the levels indicated at 85 and 87. The signal of FIGURE 6, after it has been clipped, is shown as waveform 89 in FIGURE 7. A first resistor 91 is connected between terminal 75 and the common terminal 67. A second resistor 93 is connected between terminal 75 and a terminal 95. A pair of zener diodes 97, 99 are connected in series between terminal 95 and the common terminal 67. The first of these zener diodes 97 is poled to conduct in the direction toward the common terminal 67, and the second zener diode 99 is poled to conduct in the opposite direction. The zener diodes 97, 99 constitute a second clipper which functions to clip the waveform 89 of FIGURE 7 at a fixed level, indicated at 101 and 103 in FIG. 7, so that the output at terminal 95 is a time function. This time function would include only time intervals during which the received signal is at the steady state level, and would not include time intervals during build-up, as at y and z of the next to bottom waveform 47 of FIGURE 9, nor the corresponding decay times. Thus the areas between the clipping levels 101, 103 and axis of the waveform 89 of FIGURE 7 are a function of times $t_1$ and $t_2$ of the waveform of FIGURE 4.

A third diode 105 is connected between terminal 95 and a first output terminal 107. A third resistor 109 and a first capacitor 111 are connected between the first output terminal 107 and the common terminal 67. A fourth diode 113 is connected between terminal 95 and a second output terminal 115. A fourth resistor 117 and a second capacitor 119 are connected between the second output terminal 115 and the common terminal 67. The third diode 105 is poled to conduct in the direction toward the first output terminal 107, and the fourth diode 113 is poled to conduct in the direction away from the second output terminal 115. The third resistor 109 and first capacitor 111, and the fourth resistor 117 and second capacitor 119, respectively, function as integrating networks, so that voltage between the first output terminal 107 and the common terminal 67 is proportional to resistivity $\rho$, while the voltage between the second output terminal 115 and the common terminal 67 is proportional to self-potential $sp$. In order that the circuit will function properly, the second resistor 93 should have a value much greater than the first resistor 91, and the third and fourth resistors 109, 117 should have a value much greater than that of the second resistor 93.

Figure 8:
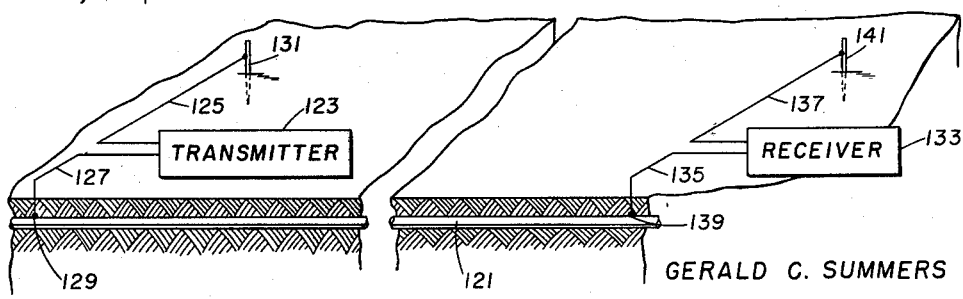
FIGURE 8 is a schematic diagram illustrating the invention as applied to a buried pipeline.

The techniques hereinbefore described with relation to bore hole communications also apply generally to the case of the buried pipeline. In FIGURE 8 there is shown a buried pipeline 121, with a transmitter 123 having its output applied via leads 125, 127 between the pipe at 129 and an electrode 131 in the earth at a point spaced laterally away from the pipe. A receiver 133 has its input terminals connected via leads 135, 137 to the pipeline at 139 and to an electrode 141 in the earth at a point spaced laterally away from the pipe. A satisfactory distance between the pipe and the electrodes, for example, may be about 150 feet; and this would apply also to the distance of electrode 39 from the well head in FIGURE 1. As an example, the parameters "quantity of natural gas flow" and "pressure" could be used as inputs for the circuit of FIGURE 3, and that circuit could be incorporated in the transmitter 123 in FIGURE 8, while the circuit of FIGURE 5 could be incorporated in the receiver 133 of FIGURE 8. It should be understood that for both the bore hole and the pipeline case, use of the polarization phenomenon allows transmission of information with less power, but the transmission rate is limited by the inherent polarization delay times. If polarization is not utilized, information can be transmitted at a greater rate, but the power requirements will also be greater.

Figure 11:
FIGURES 9, 11 and 12 are schematic showings of waveforms to aid in explanation of the invention.
Figure 12:
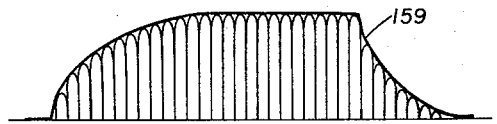
Figure 10:
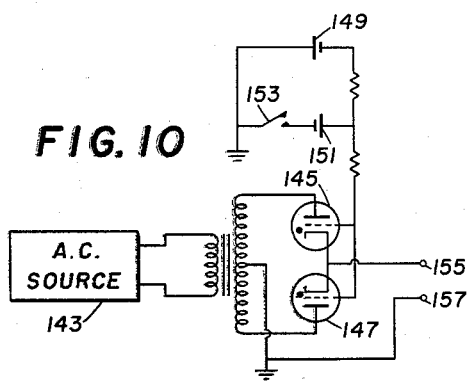
FIGURE 10 is a schematic circuit diagram for use in connection with another embodiment of the invention.

Another embodiment of my invention is illustrated by FIGURES 10, 11 and 12. It is common practice for corrosion inhibition purposes to apply to a pipeline large, unfiltered, direct currents. One aspect of my invention involves the use of such corrosion inhibition currents in a pipeline communications system. Intelligence may be transmitted by keying the corrosion inhibition currents and making the parameter to be transmitted a function of on or off keying time. FIGURE 10 shows in schematic form a circuit suitable for use as an intelligence source, or transmitter in such a communications system. In FIGURE 10, A.C. power is supplied from a suitable source 143 to a conventional full wave rectifier comprising a pair of thyratrons 145, 147 which have their control electrodes connected in series with a bias network to ground. The bias network is shown as two oppositely poled batteries 149, 151, one of which is in series with a keying device 153. When the key 153 is open, the thyratrons 145, 147 are biased to cut off so there is no output at terminals 155, 157, and when the key 153 is closed, the net bias is such that the thyratrons will conduct causing a full wave rectified output to appear at terminals 155, 157. This keyed output waveform is shown schematically in FIGURE 11, and may be applied via conductors 125, 127 between the pipe 129 and electrode 131 of FIGURE 8. The signal that would be present at the input of the receiver 133 of FIGURE 8 would be the envelope 159 of the waveform shown schematically in FIGURE 12. This receiver input waveform may then be operated on with conventional circuitry well known to those skilled in the art to produce a receiver output which would be a function of the on or off keying time, which in turn is a function of the parameter or intelligence being transmitted. If the corrosion inhibition current keying rate is made sufficiently low, then the earth polarization phenomenon can be utilized, and use of such phenomenon in the corrosion inhibition current keying communication system embodiment is also contemplated as a further embodiment of the invention. The envelope of FIGURE 12 is actually shown in the form it would take when earth polarization phenomenon is utilized.

It will be apparent from the foregoing that I have provided communications systems applicable both to bore hole and pipeline communication wherein buried pipe or equivalent is utilized as a portion of the systems; wherein neither wire nor wireless transmission of signals from transmitting to receiving points is required; and wherein, in some embodiments, only low power input levels are required; and wherein, in some embodiments of the invention, corrosion inhibition currents are utilized in pipeline communications systems.

While I have shown my invention in several forms, it will be obvious to those skilled in the art that it is not so limited, but is susceptible of various changes and modifications without departing from the spirit thereof.

I claim:

1. A system for transmitting intelligence between spaced points along a pipe having conductive contact along its length with the earth which comprises means for conductively applying a signal of square waves having frequencies below about 2 cycles per second between said pipe and the earth adjacent to a sending station, means for modulating the time length of said square waves in dependence upon an intelligence-bearing signal, means at a receiving location spaced from said sending station for detecting signal potentials existing between a point on said pipe and a point laterally spaced a substantial distance from said pipe wherein said signal potentials include noise components and, by reason of the low frequency, are characterized by earth polarization of currents applied at said sending station, means for clipping said signal potentials at a predetermined level, and means for separately sensing the positive and negative components of said signal potentials exceeding said level.

2. A system for transmitting intelligence between spaced points along a pipe having conductive contact along its length with the earth which comprises means for conductively applying a signal of square waves having frequencies below about 2 cycles per second to said pipe at a sending station, means for modulating said square waves in dependence upon an intelligence-bearing signal, means connected to said pipe at a receiving location spaced from said sending station for detecting signal potentials at said frequencies wherein said signal potentials include noise components and, by reason of the low frequency, are characterized by earth polarization of currents applied at said sending station, means for clipping said signal potentials at a predetermined level, and means for separately sensing the positive and negative components of said signal potentials exceeding said level.

References Cited in the file of this patent

UNITED STATES PATENTS

| | | |
|---|---|---|
| 1,297,929 | Taylor | Mar. 18, 1919 |
| 2,148,389 | Yonkers | Feb. 21, 1939 |
| 2,364,957 | Douglas | Dec. 12, 1944 |
| 2,400,170 | Silverman | May 14, 1946 |
| 2,411,696 | Silverman et al. | Nov. 26, 1946 |
| 2,544,569 | Silverman | Mar. 6, 1951 |
| 2,557,168 | Arps et al. | June 19, 1951 |